(No Model.)

T. SHARTS.
GRATING FOR ILLUMINATING TILES.

No. 411,134. Patented Sept. 17, 1889.

WITNESSES:
Gustave Dieterich
William Goebel.

INVENTOR
Theodore Sharts

UNITED STATES PATENT OFFICE.

THEODORE SHARTS, OF NEW YORK, N. Y.

GRATING FOR ILLUMINATING-TILES.

SPECIFICATION forming part of Letters Patent No. 411,134, dated September 17, 1889.

Application filed May 23, 1889. Serial No. 311,791. (No model.)

*To all whom it may concern:*

Be it known that I, THEODORE SHARTS, of the city, county, and State of New York, have invented certain new and useful Improvements in Gratings for Illuminating-Tiles for Sidewalks, Areas, Stoops, Floor-Lights, Roof-Lights, &c.; and I do hereby declare that the following is a full, clear, and exact description thereof, reference being had to the accompanying drawings, making part of this specification, in which—

Figure 1:
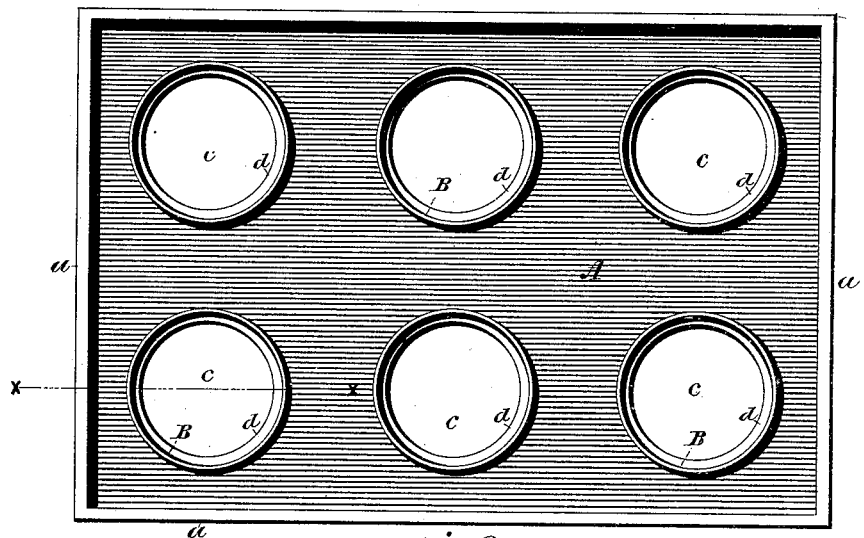
Figure 2:
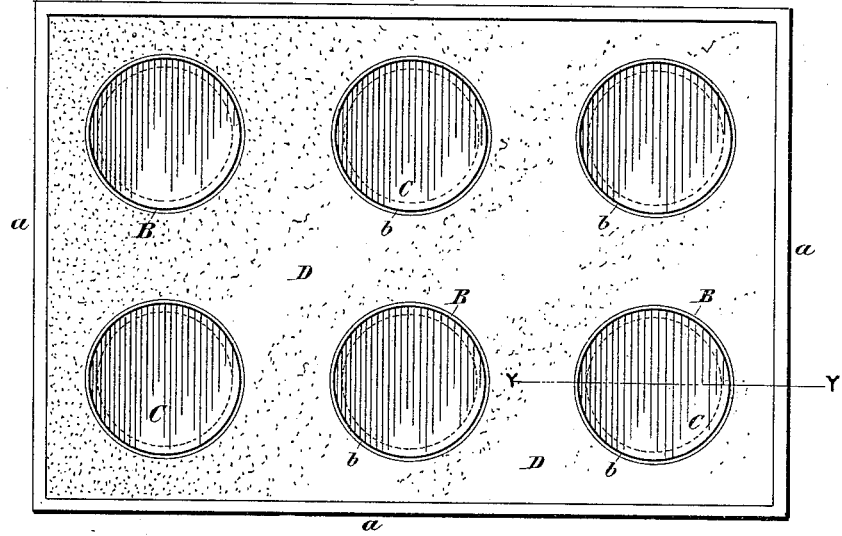
Figure 3:
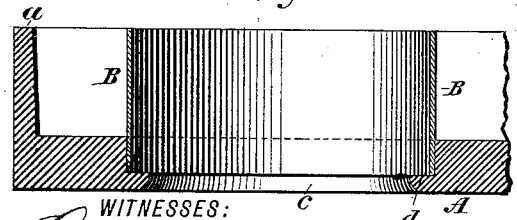
Figure 4:
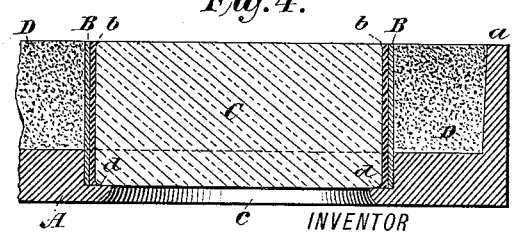

Figure 1 is a plan view of my composite gratings or bed-plate before the concrete cement is placed thereon or the glass lenses or bull's-eyes are inserted within the rings. Fig. 2 is a plan view of my illuminating-tile complete, with the concrete cement filling and glass lenses in place. Fig. 3 is a longitudinal vertical section of the same on the line $x\ x$, Fig. 1. Fig. 4 is a longitudinal section on the line $y\ y$, Fig. 2, passing through the center of the glass lenses.

Similar letters indicate corresponding parts.

A represents the bottom plate or grating. B represents the metallic rings. C represents the glass lenses or bull's-eyes. D represents the concrete cement filling; $a$, the flange around the outside of the bed-plate; $b$, the cement between the metallic rings and glass lenses; $c$, the openings through the bottom plate for transmission of light, and $d$ the flange or seat upon which the glass lenses rest.

My invention consists of a composite bed-plate or grating A, having metallic rings B B firmly embedded into it around openings $c\ c$ for the transmission of light, these openings to be covered by glass lenses C C, fastened inside said rings by any suitable cement or packing $b\ b$, and the spaces or the bed-plate outside the rings to be filled with concrete cement D D, or other anti-slipping material, the glass lenses resting upon the annular flanges or seats $d\ d$. The said rings B B may be made round, square, corrugated, polygonal, or any other desired shape. The sides of these rings may be made perfectly straight vertically or slightly tapering from top to bottom, the bottom being the largest in diameter, or may be convex-concave. I prefer the latter shape, as it tends to hold more firmly the concrete filling to the bed-plate on the outside of the rings, also the cement between the glass lenses and the inside of the rings. When required, a flange $a\ a$ may be cast upon and around the bed-plate A.

I first prepare a sufficient number of metallic rings, which may be made of galvanized iron, malleable iron, brass, copper, or any other suitable metal. These metallic rings are inserted a short distance into cavities made for their reception around openings for the transmission of light in the pattern from which the casting of the bed-plate is to be made, and are molded up with the pattern in the sand at the foundry. When the pattern is withdrawn from the mold, the metallic rings remain fastened and covered in the sand, except the portion left protruding into the mold. When the melted iron is poured into the mold, it flows around and adheres to the exposed edges of the metallic rings. When the casting is removed from the sand, the metallic rings will be firmly fastened to and embedded in the casting, thus forming a composite bed-plate. The bed-plate being thus prepared, I insert the glass lenses C C within the metallic rings B B and flush with the top edge of said rings, and fasten them in places upon the flanges $d\ d$ by pouring a water-proof cement $b\ b$, or other suitable packing, between and around the said lenses and rings. I then fill the spaces on the bed-plate outside the rings with concrete cement D, or other anti-slipping material, flush with the surface of the glass lenses and rings, making an illuminating-tile having an even and anti-slipping surface and with every part firm and compact.

I am aware that bed-plates for concrete illuminating-tiles have heretofore been made entirely of cast-iron, having annular rings upon the surface for the reception of bull's-eyes. The surfaces of the rings are required to be quite thick, in order to have the melted iron, when casting at the foundry, to flow freely into them and flush with the surface. This large proportion of smooth iron upon the surface of the tile renders it slippery and dangerous to pedestrians walking over it, beside the cast-iron, being exposed to the atmosphere, corrodes and discolors the surrounding concrete filling.

I am also aware that loose detachable metallic rings having glass lenses inserted into them in the usual manner have heretofore been used by being set loosely upon a bed-plate or grating and merely held in position by the concrete filling surrounding them. The rings, setting loose upon and not firmly and permanently fastened to the bed-plate, are liable upon any sudden concussion to be started from their seats and tear away and destroy the concrete filling.

In my invention, as illustrated and described in this specification, the metallic rings may be made very thin and present no smooth surface for slipping, and can be made of material that will not corrode and discolor the concrete filling. Again, my metallic rings, being firmly fastened to and embedded into the cast-iron bottom plate, cannot be disturbed by any violent concussion, and tend to help secure the concrete filling surrounding them intact instead of relying upon it for their own support.

I do not confine myself to any particular method of fastening the metallic rings to the bottom plate, as numerous devices can be adopted for the same purpose; but I prefer the within-described method as being the most simple and economical.

Having thus described my invention, what I desire to secure by Letters Patent is—

A grating for illuminating-tiles, having light-openings therein, surrounded by protruding rings of a different metal for the reception of lenses, said rings being rigidly united to the grating by casting the metal of the grating around that of the rings, substantially as set forth.

THEODORE SHARTS.

Witnesses:
C. EUGENE KEYES,
J. H. GOODWIN.